(12) United States Patent
Bachu et al.

(10) Patent No.: US 11,879,485 B2
(45) Date of Patent: Jan. 23, 2024

(54) SNAP-FIT ASSEMBLY FOR SECURING ELECTRONIC COMPONENTS AT HARD-TO-REACH LOCATIONS

(71) Applicant: Polestar Performance AB, Gothenburg (SE)

(72) Inventors: Ashok Kumar Bachu, Gothenburg (SE); Sumegh Kadam, Gothenburg (SE); Björn Scherdin, Gothenburg (SE)

(*) Notice: Subject to any disclaimer, the term of this patent is extended or adjusted under 35 U.S.C. 154(b) by 555 days.

(21) Appl. No.: 16/951,539

(22) Filed: Nov. 18, 2020

(65) Prior Publication Data

US 2021/0348630 A1 Nov. 11, 2021

Related U.S. Application Data

(60) Provisional application No. 63/021,479, filed on May 7, 2020.

(51) Int. Cl.
*F16B 2/22* (2006.01)
*B60L 58/10* (2019.01)
*B60K 6/28* (2007.10)

(52) U.S. Cl.
CPC .............. *F16B 2/22* (2013.01); *B60L 58/10* (2019.02); *B60K 6/28* (2013.01); *B60Y 2200/91* (2013.01); *B60Y 2200/92* (2013.01); *B60Y 2400/302* (2013.01); *B60Y 2400/3086* (2013.01)

(58) Field of Classification Search
CPC .... B60K 1/04; B60K 2001/0438; B60K 6/28; B60L 3/0007; B60L 50/64; B60L 50/66; B60L 58/10; B60Y 2200/91; B60Y 2200/92; B60Y 2400/30; B60Y 2400/302; B60Y 2400/3086; F16B 2/22; F16B 2/245; F16B 5/0635; Y02T 10/70
See application file for complete search history.

(56) References Cited

U.S. PATENT DOCUMENTS

2018/0310421 A1* 10/2018 Kato .................... H05K 5/0247

* cited by examiner

*Primary Examiner* — Victoria H Lynch
(74) *Attorney, Agent, or Firm* — Kilpatrick Townsend & Stockton LLP (57) ABSTRACT

A snap-fit assembly that allows securely attaching and locking components to each other or to wall-like objects. The snap-fit assembly includes an electronic device with a plastic housing designed to have at the same surface a set of oppositely disposed hooks and a tab for defining an area which is shaped and dimensioned to receive a sliding mechanical bracket. The hooks guide the mechanical bracket into place and securely attach the mechanical bracket to the plastic housing, while the tab forms a stop device for the mechanical bracket, while at the same time locking into a locking opening formed at the mechanical tab.

17 Claims, 6 Drawing Sheets

SNAP-FIT ASSEMBLY FOR SECURING ELECTRONIC COMPONENTS AT HARD-TO-REACH LOCATIONS

CROSS-REFERENCE TO RELATED APPLICATIONS

This application claims priority to U.S. Provisional Patent Application Ser. No. 63/021,479, filed on May 7, 2020, and entitled "SNAP FIT CONNECTION ASSEMBLY FOR TRACTION BATTERY", commonly owned and assigned to the same assignee hereof.

BACKGROUND

Field

The present invention relates to sliding snap-fit assemblies for securely attaching and locking components.

Background

Attachment assemblies and devices are described in prior art for attaching components to one another or to wall-like objects. Examples include rivets, screws, bolts, hooks, adhesives, Velcro, twisting knobs and the like. Each is directed to a specific type of uses and conveys a variety of features and limitations.

SUMMARY

The present disclosure is directed to an improved snap-fit assembly that allows securely attaching and locking components to each other or to wall-like objects. In particular, it relates to a plastic housing designed to have at the same surface a set of oppositely disposed hooks and a tab for defining an area which is shaped and dimensioned to receive a sliding mechanical bracket. The hooks guide the mechanical bracket into place and securely attach the mechanical bracket to the plastic housing, while the tab forms a stop device for the mechanical bracket, while at the same time locking into a locking opening formed at the mechanical tab. The mechanical tab is shaped and dimensioned as two parallel surfaces linked by a third surface at an angle relative to the parallel surfaces. The parallel surfaces are each designed with an opening, one opening acting as a locking position for the tab of the plastic enclosure to lock and the other opening facilitating the secure attachment of the tab to walls or other objects. The snap-fit assembly allows for secure attachment and locking simply by sliding motion until the stop device engages, without the need for screwdrivers or other tools. Similarly, unlocking and detachment is possible without the use of tools.

The previous exemplary implementations can be used in the car industry for securely attaching and locking Cell Voltage Temperature Node devices onto walls of traction battery trays. Other uses include the attachment and locking of enclosures containing processors, electronic components and devices. Further uses include the integration or attachment of the snap-fit device to mechanical and other components for secure attachment and locking while allowing their easy and fast unlocking and detachment.

DETAILED DESCRIPTION

The word "exemplary" is used herein to mean "serving as an example, instance, or illustration". Any embodiment described herein as "exemplary" is not necessarily to be construed as preferred or advantageous over other embodiments.

The acronym "BMS" is intended to mean "Battery Management system".

The acronym "BOM" is intended to mean "Bill Of Materials".

The acronym "CVTN" is intended to mean "Cell Voltage Temperature Node".

The acronym "MCU" is intended to mean "Micro-Controller Unit".

The acronym "PCB" is intended to mean "Printed Circuit Board".

The terms "device" and "module" may be used interchangeably with "unit" or "subunit", except where it is obvious to a reader of ordinary skill in related art that these terms refer to different things, as this is apparent by the context of the discussion in which they appear.

Many industrial automation systems include one or more types of sensors that provide digital or analog inputs to industrial controllers, safety controllers, or other supervisory devices. Such sensors include, but are not limited to, photoelectric sensors that use optical beams to detect the presence of a person or object, inductive proximity sensors that detect the presence of metal objects, safety sensors that provide safety inputs to a safety controller associated with a hazardous industrial area, and other such sensors.

There is a need across multiple industries for the ability to quickly install and uninstall such sensing devices. Installation of sensing devices can consume a substantial amount of time, particularly when complex multi-part brackets or screws are used to affix the housing of the sensing device to a mounting surface. Similarly, when a sensing device becomes faulty and needs to be replaced, disassembling a complex mounting bracket so that the faulty sensing device can be removed and replaced with a new sensing device can be a time-consuming process. The time invested in replacing faulty sensors is compounded when multiple sensing devices need to be replaced. In the case where a production line may need to be shut down while a device is being installed or replaced for safety purposes, any extra downtime is particularly troublesome. Thus, the more time that is required to install or replace an industrial sensor, the greater the cost in lost productivity and revenue. When production downtime associated with sensor installation and replacement is compounded over multiple sensors, the cost of lost production can extend into the thousands or tens of thousands of dollars per minute.

Moreover, many multipart clamping-style brackets that are often used to mount sensing devices are made up of many interlocking components, which can be easily lost when the bracket is disassembled during mounting or removal of a sensing device.

To address these and other issues, one or more embodiments described herein provide a housing and snap-fit bracket with complementary mating features.

The interaction between the housing and the snap-fit bracket described herein provide a simple, rugged, and reliable fixation of the housing. The design yields a small footprint and low size profile, rendering the housing and bracket assembly suitable for use in small or constricted spaces. The design also allows the housing to be assembled to and disassembled from the bracket without the need for additional tools.

The following description of the present innovative assembly is done by means of an example in the car industry. In particular, the example is a snap-fit connection assembly used for installing and securing Cell Voltage Temperature Nodes (CVTN) for electric vehicle traction batteries on traction battery compartments. The choice of this example is by no means limiting the scope of protection of the present innovative assembly. Instead, the example is merely an illustration of the details of the design of the innovative assembly and its use. The innovative assembly should, thus, be understood to be applicable to a variety of applications, not explicitly mentioned in the present description, as well as, to include various modifications of the exemplary design presented below. The modifications and the applications of the assembly include all the possible modifications and the applications that are obvious to any person of ordinary skill in related art and which do not require undue experimentation to conceive and implement.

The exemplary discussion is applicable to "electric" and "hybrid" vehicles and the mention of either term is assumed to also mean both terms unless explicitly stated otherwise or unless it is obvious to a skilled person that it refers only to the explicitly mentioned term.

Figure 1:
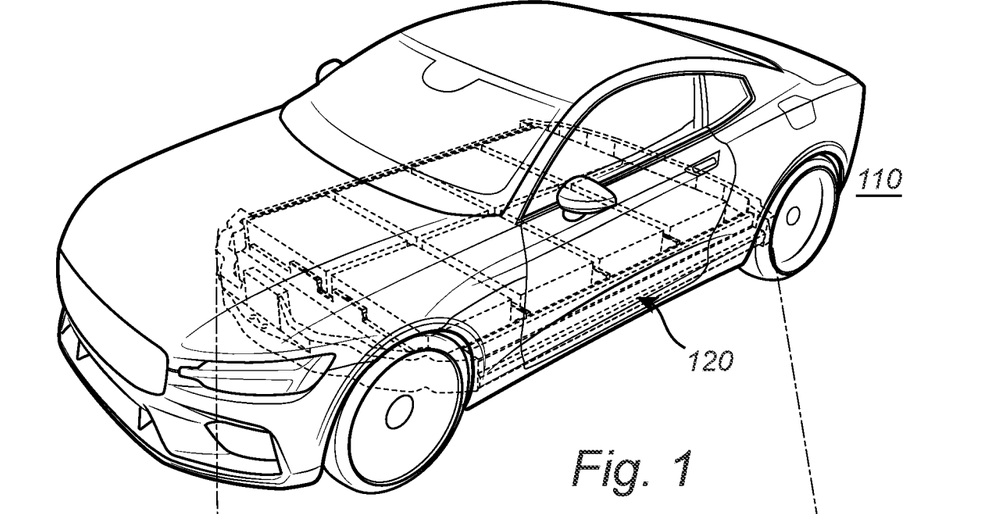
FIG. 1 is a high-level visualization of an electric vehicle normally equipped with an example traction battery assembly.

FIG. 1 is a high-level visualization of an electric vehicle 110 normally equipped with an example traction battery assembly 120.

More specifically, traction battery assembly 120 is mounted on the frame of electric vehicle 110 commonly referred to as the chassis. The size, depth, orientation, number of battery compartments, and the like associated with a given traction battery assembly is determined by the manufacturer taking into consideration a number of different considerations. The idea is to efficiently exploit available space inside the vehicle, keep a low center of gravity for better handling of the vehicle during driving, and protect the battery from environmental conditions, impact, etc. One skilled in the art would appreciate that many different traction battery assembly configurations are possible.

Figure 2:
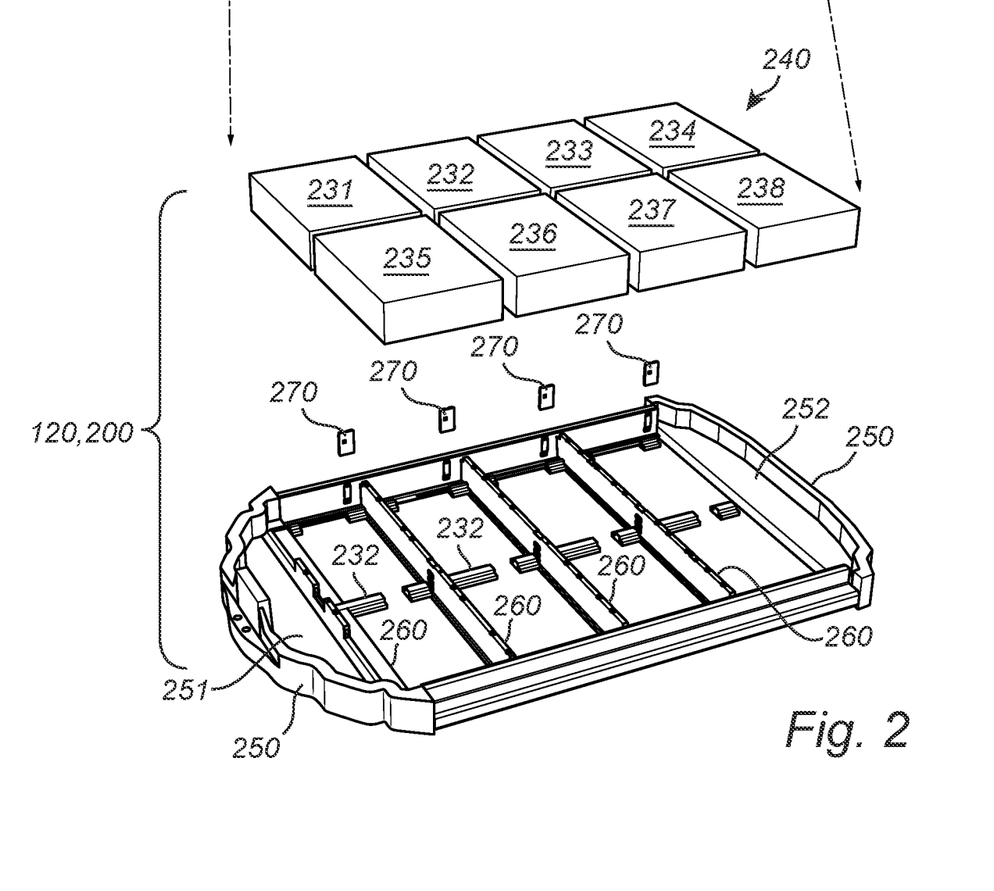
FIG. 2 is also a high-level visualization, in exploded view, of an example traction battery assembly such as that in FIG. 1.

FIG. 2 is also a high-level visualization, in exploded view, of an example traction battery assembly 200 such as that in FIG. 1.

Traction battery assembly 200 contains a traction battery tray 240, which houses, securely holds and protects battery cells 231-238. Battery cells 231-238 are installed inside traction battery tray 240 and are kept in place by divider components 260. Traction battery tray 240 is framed by components 250. The design of traction battery tray 240 also allows to place additional battery cells (not shown) in the irregularly shaped areas 251, 252 bordered by divider components 260 and framing components 250 at the front and rear ends of traction battery tray 240. Battery cells 231-238 are placed on top of mounting parts 232 for secure attachment to the traction battery tray 240 and for allowing ventilation for cooling battery cells 231-238.

Divider components 260, framing components 250, and mounting parts 232 may be shaped to include protrusions or indentations along their length for structural strengthening, resistance to deformation when pressure is exerted to them, and for providing additional surfaces for improved heat conduction used for cooling battery cells 231-238.

Traction battery tray 240 also houses Cell Voltage Temperature Nodes (CVTN) 270. CVTNs are electronic components that form part of the Battery Management system (BMS) of a traction battery in an electric (or hybrid) vehicle. CVTNs 270 monitor battery cell temperature in the traction battery compartment and do this with onboard sensors, microcontrollers, memory and other electronics typically imprinted on a Printed Circuit Board (PCB) to form one of hundreds of microprocessor control units in the vehicle. The choice of electronics inside CVTN 270 do not form part of the present innovative assembly and, thus, are not presented in detail.

In one aspect, traction battery tray 240 is welded on the chassis of car 110. In another aspect, traction battery tray 240 is screwed (using rivets, screws, nuts, or the like) on the chassis of car 110. In yet another aspect, traction battery tray 240 is an integral part of the chassis of car 110. Traction battery tray 240 is typically metallic, aluminum, or an aluminum alloy material.

Figure 3:
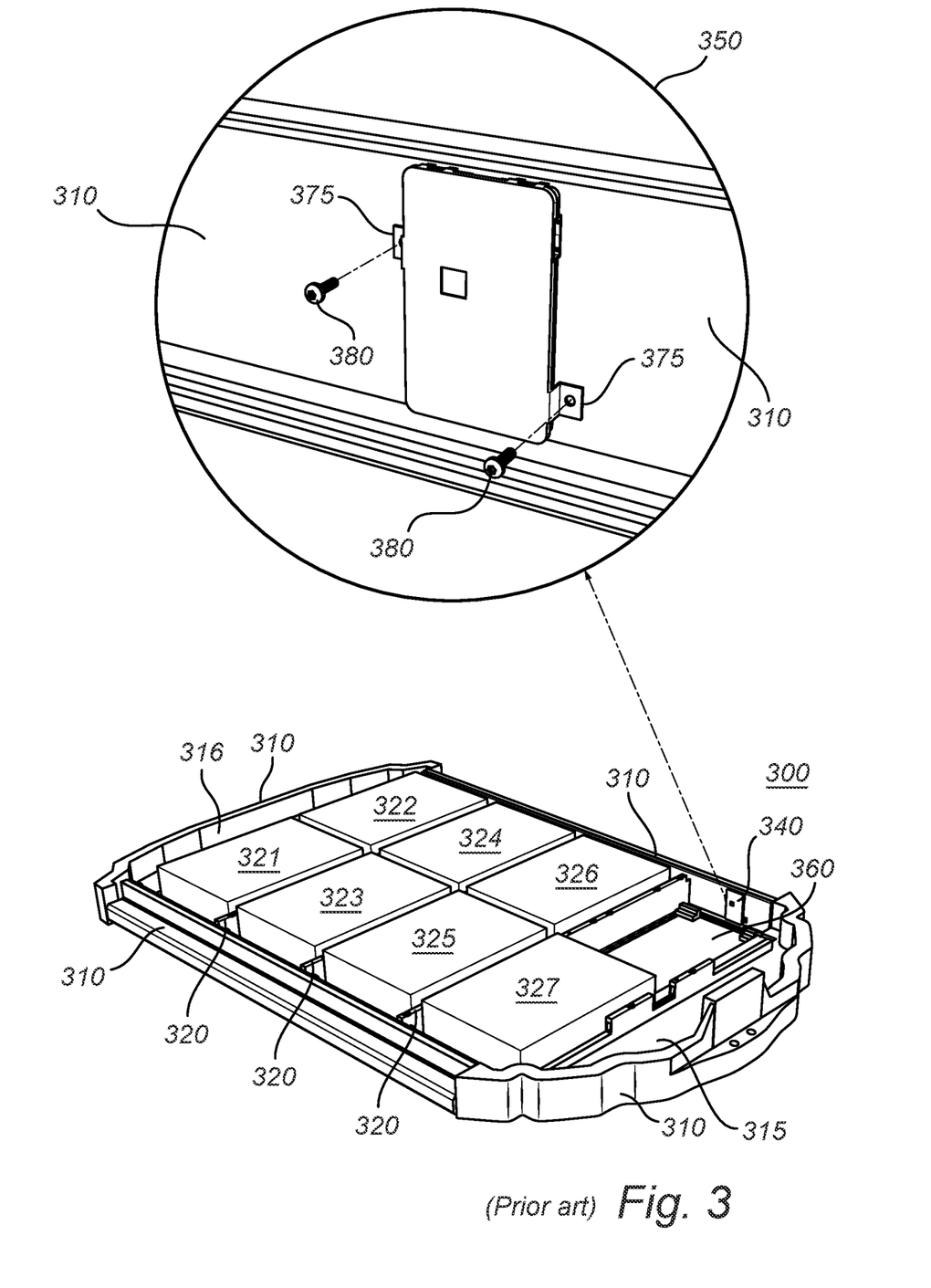
FIG. 3 shows an example prior art traction battery assembly and a magnified view of a portion of a wall of a battery tray compartment showing how electronic components are typically mounted.

FIG. 3 shows an example prior art traction battery assembly 300 and a magnified view 350 of a portion of a wall of a battery tray compartment 360 showing how electronic components are typically mounted.

Traction battery assembly 300 has framing components 310 and divider components 320 forming battery compartments where traction battery cells 321-327 are installed. Electrical connections are not shown for easier visualization. Battery compartment 360 is shown with no battery cell installed for visualizing CVTN 340, which is installed inside battery compartment 360, and in particular, on framing component 310. All battery compartments have CVTNs installed similarly to CVTN 340 in battery compartment 360.

Magnified view 350 shows CVTN 340 mounted on framing component 310. CVTN 340 is shown having two protruding wing parts 375, which function as attaching wall brackets, to attach the CVTN to the wall surface of framing component 330 using screws 380.

During manufacturing of the body of CVTN 340, the manufacturer has to either weld or screw wing parts 375 onto the body of CVTN 340, effectively increasing the cost of the Bill Of Materials (BOM) by the inclusion of additional parts and securely attaching them in place. These and related construction and assembly details significantly burden a design from a cost, durability and reliability standpoint. Also, they create constraints in terms of what material (metal versus plastic) can be used.

Furthermore, the prior art battery assembly of FIG. 3 necessitates that CVTN 340 be screwed onto framing component 310. Screwing is done by a screwdriver with a shaft that must be long enough to reach the positions for the screws in the axial direction. Such a screwing operation is more often than not a complicated operation, as the positions for the screws on framing component 310 are not easily accessible. Examples include battery compartment 360 and more notably the battery compartments near the front 315 and rear 316 ends of traction battery tray assembly 300. Front 315 and rear battery compartments are narrow and of irregular shape making screwing operations very cumbersome as the screwdriver shaft would have to be inclined and the screwdriver would have to operate at an angle with respect to the surface of framing component 310.

As is well known, a screwdriver is designed to operate in alignment with the direction of screwing a screw and any angle between the screwdriver shaft and the shaft of the screw significantly decreases the amount of torque that can be transferred from the screwdriver head to the screw. As a result, screwing may become impossible or lead to incorrect screwing of the screw at an angle with respect to the surface upon which the screw is screwed, ultimately leading to reduced efficiency of the screw and potential damage.

An even more difficult situation occurs when the traction battery tray 240, 310 is already installed (without CVTNs) during manufacturing in vehicle 110 or when traction battery tray 240, 310 is an integral part of the vehicle's chassis. In these situations, obstacles exist in the access of the screwdriver to the positions of the screws.

An even more difficult situation occurs when CVTN 340 needs to be serviced or replaced in a vehicle that has been fully assembled and has left the manufacturing facilities. In such a situation, additional obstacles exist such as inner car floor, floor cover materials, seats, etc., which may have to be completely removed before a screwdriver can operate (even at an angle) on screws 380.

As presented in the above scenarios, it is not only difficult to access and screw screws 380 but it is also very time consuming and expensive, and in many situations can result into insecure attachment of CVTN 340 and even damages and other serious risks. Even though a possible solution would be to design, manufacture and use special screwdrivers that could operate efficiently at an angle, or flexible screwdrivers to bypass obstacles, or to modify the design of traction battery tray 240, 310, all the previous potential solutions are expensive to implement, difficult or even impossible to manufacture, and unreliable or insufficient.

There is a clear need for a solution that will reduce cost, and increase efficiency, reliability, durability and ease of operations during and after assembly for CVTNs and like electronic and other sensor devices and particularly for electrical/hybrid vehicles, but also for industrial and other applications. This need also involves the secure attachment and replacement of components and modules without the use of any tools.

Considering a broader usage scenario, there is a clear need for a solution that is applicable to secure, reliable, durable, and low-cost fixing and replacement of components and modules onto assemblies or components that involve narrow spaces and obstacles. This need also involves the fixing and replacement of components and modules without the use of any tools.

Innovative Snap Fit Assembly

An improved CVTN, and specifically, an improved CVTN housing and CVTN housing bracket and housing assembly combination are herein described. The newly proposed implementation requires no tools to install or disconnect and may be used as housing for a CVTN or like Micro-Controller Unit (MCU) device and in connection with the housing portion of the assembly is preferably made of plastic or material of like elasticity.

The proposed implementation is achieved entirely as a snap-fit connector. Exemplary implementations are shown in the figures below.

Figure 4A:
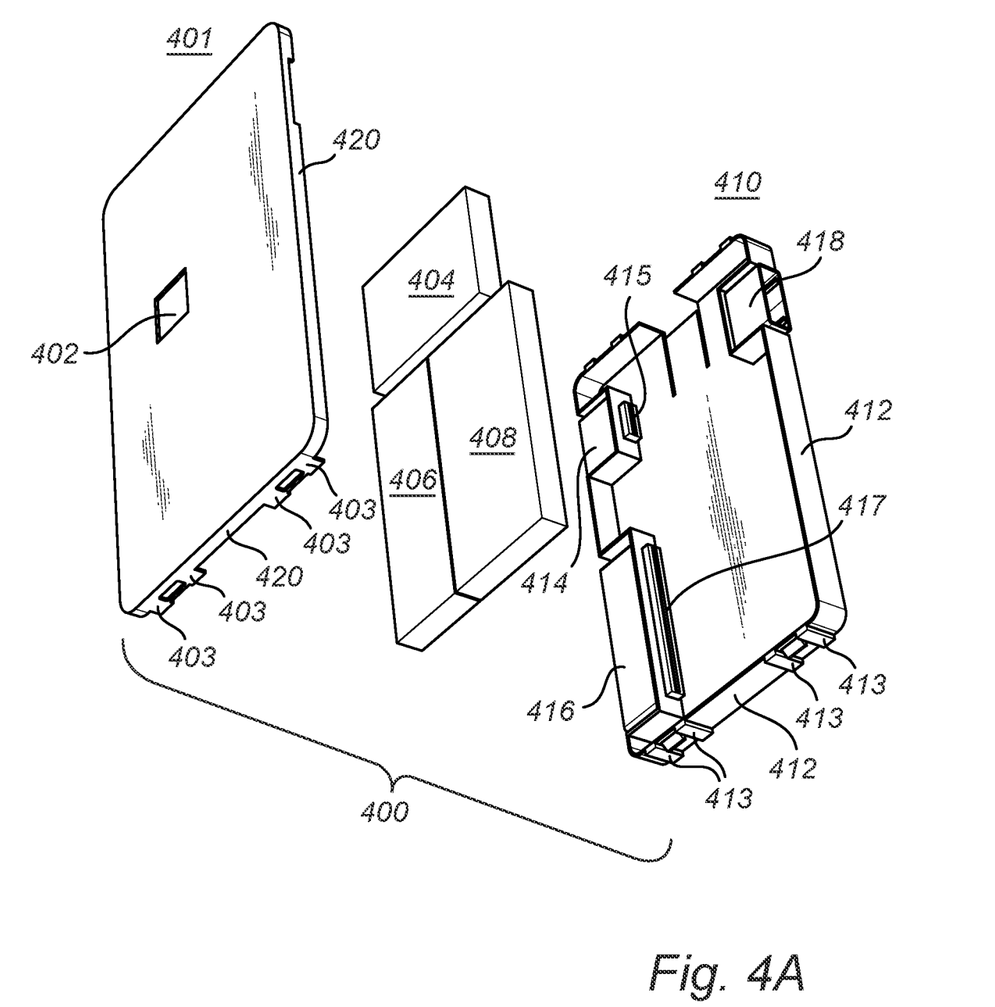
FIG. 4A is an exploded frontal (anterior) view of an electronic component configured for snap-fit assembly in accordance with an exemplary embodiment.

FIG. 4A is an exploded frontal (anterior) view of an electronic component 400 configured for snap-fit assembly in accordance with an exemplary embodiment. In one scenario, electronic component 400 is a CVTN (hereafter "CVTN 400") of the type configured to be mounted to a wall of a battery compartment.

CVTN 400 contains a housing upper face plate 401, which is shown having a sensor window 402 and a set of protruding members 403 defined by a laterally extending peripheral wall 420. Sensor window 402 and the set of protruding members 403 are integral parts of housing upper face plate 401 and may be created during manufacturing of face plate 401.

Housing face plate 401 may be manufactured either as a metal or metal alloy, or as a plastic or plastic-like material. When housing face plate 401 is manufactured in a plastic or plastic-like material, the material may be chosen among known plastic or plastic-like materials that possess sturdiness and hardness so as to ensure material integrity during hard use and impact, as well as elasticity and shape memory to allow for deformation, which is especially useful for protruding members 403 used to snap-fit attach to a housing back plate 410, as in the example scenario.

Where Electro-Magnetic Compatibility (EMC) protection is desired for enclosed electronic components of CVTN 400, housing face plate 401 may optionally be manufactured of a metal or metal alloy. Alternatively, housing face plate 401 may be manufactured of a plastic or plastic-like material and the material chosen from among plastic or plastic-like materials that possess EMC properties or be internally coated (e.g., by spaying or lining) with a material possessing EMC properties.

Similarly, housing back plate 410 may be made of plastic or plastic-like material of the same or similar type and properties as the plastic or plastic-like material that may be used for the manufacturing of housing face plate 401. Protruding members 403 are designed to snap-fit and/or snug-fit unto coupling sections 413 of housing back plate 410 matching the position and shape of protruding members 403.

Protruding members 403 of housing face plate 401 are configured as integral parts of peripheral wall 420. Peripheral wall 420 is shaped and dimensioned to tightly fit and enclose against housing back plate 410 and sized to fit around peripheral wall 412 of housing back plate 410.

Housing back plate 410 also contains connector parts 414, 418, 416 with connector sockets 415, 417 upon which wires and electronic components/boards plug-in (not shown).

In one exemplary embodiment, coupling sections 413 and connector parts 414, 418, 416 are formed along vertical walls 412 and molded from a single mass of plastic or plastic-like material. In another scenario, connectors parts 414, 418, 416 are separate connectors and attached individually onto vertical wall 412.

Similarly, connector sockets 415, 417 may be attached to connector parts 414, 416, 418 by a snap-fit mechanism (not shown), or by molding or simply by placing them on housing back plate 410.

Housing face plate 401 and housing back plate 410 are configured to "house" one or more combination of electronic modules (404, 406, 408) and/or sensors depending on the use or application of electronic component 400. In the case of a CVTN, the electronic module includes, among other things, house a temperature sensor employed in electric vehicles to sense temperature in a battery compartment through sensor window 402. Electronic modules 404, 406, 408 are electrically internally connected in CVTN 400 with components external to the CVTN via connector sockets 415, 417.

Figure 4B:
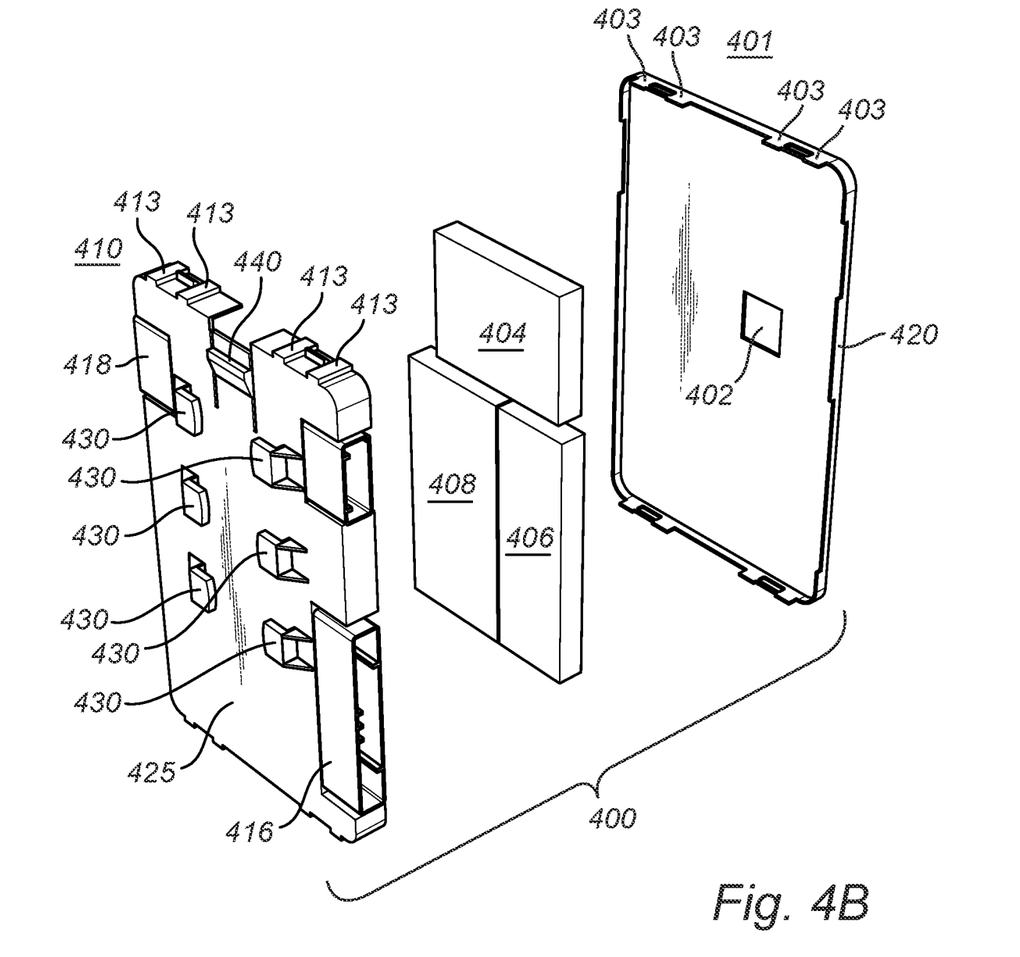
FIG. 4B is an exploded flipped (posterior) view of the electronic component in FIG. 4A.

FIG. 4B is an exploded flipped (posterior) view of the electronic component (CVTN 400) in FIG. 4A.

With respect to the flipped view, emphasis is drawn to the back (exposed) surface 425 of back plate 410 which facilitates connecting CVTN 400 to an external wall via a mechanical bracket (not shown). In the exemplary embodiment, back surface 425 is uniquely sized and dimensioned to include hooks 430 that are designed to slide down onto and over a mechanical bracket that is fixed in position (to be described in further detail below). In the preferred scenario, housing back plate 410 is a deformable or elastic material such as plastic or plastic-like material. This will facilitate being able to easily slide and secure CVTN 400 over a mechanical bracket preferably without the use of any tool. Specifically, it will allow housing back plate to slide and grab onto the mechanical bracket with sufficient force so that it is sufficiently snug, will not come loose during expected vehicle stresses, and in a manner that does not require a tool to slide the CVTN housing down on the bracket (which when done looks as in FIG. 5B) and when attempting to do so, or when removing once installed, looks as in FIG. 5A.

Figure 5A:
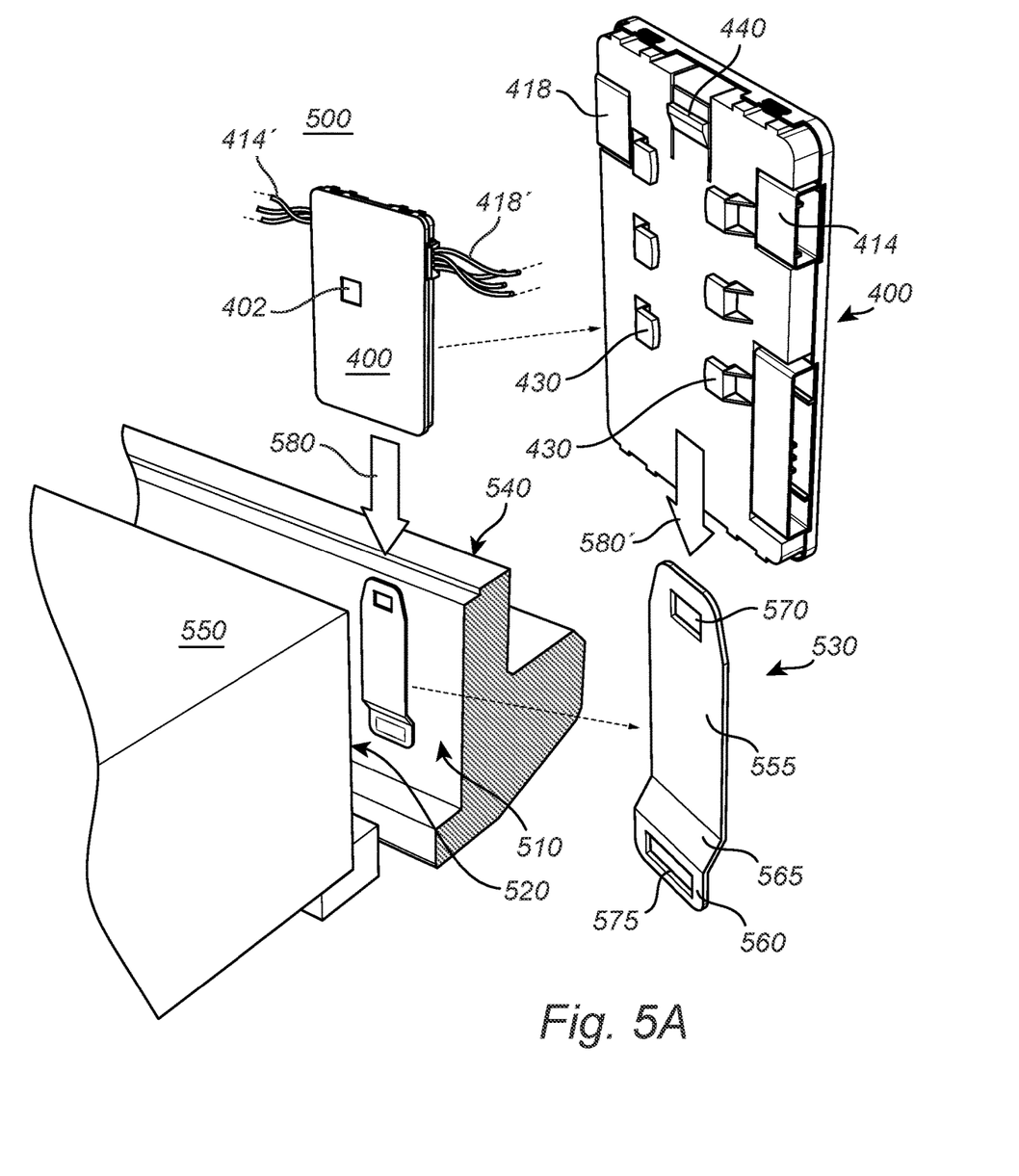
FIG. 5A shows a view of a snap-fit assembly arranged for snap-fit connection between two closely spaced walls. The snap fit assembly consisting of the electronic component of FIGS. 4A, 4B and a bracket configured for snap-fit mating connection to the electronic component in accordance with an exemplary embodiment.
Figure 5B:
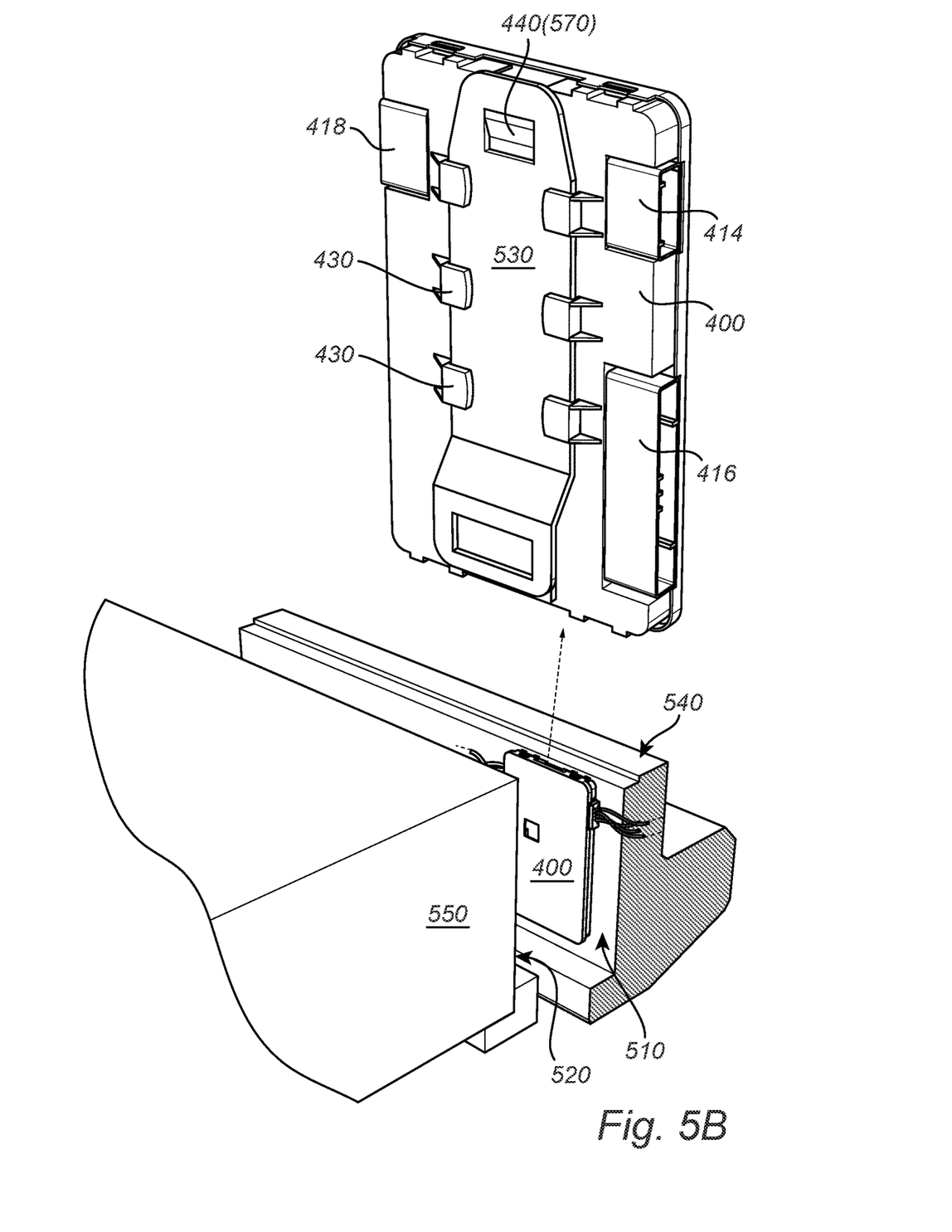
FIG. 5B is an alternate view of FIG. 5A showing the electronic component snap-fitted securely into the intended position onto the bracket between the two closely spaced walls.

Housing back plate 410 is further provided with locking tab 440 which is shaped and dimensioned to more securely lock into place housing back plate 410 (and consequently CVTN 400) onto the mechanical bracket (as shown in FIG. 5A and FIG. 5B).

In the example implementation, hooks 430 are shown arranged in three pairs oppositely disposed together with locking tab 440. One skilled in the art would appreciate that alternative implementations include more locking tabs, more or less hooks, different orientations, shapes and dimensions of one or the other, as well as, additional locking features, and which are all within the scope of the claimed invention as intended.

Attaching the Hooks and Tab onto the Bracket of the Snap-Attach Assembly

FIG. 5A shows a view of a snap-fit assembly 500 arranged for snap-fit connection between two closely spaced wall surfaces 510, 520. The snap fit assembly 500 consisting of the electronic component 400 of FIGS. 4A, 4B and a bracket 530 configured for snap-fit mating connection to the electronic component 400 in accordance with an exemplary embodiment.

For purposes of illustration, electronic component 400 corresponds to our CVTN 400 and is shown in closed position, meaning the housing face and back plates and internal electronic modules have been joined to form a single housing unit. The first of the two closely spaced wall surfaces (510) is defined by the inner wall surface of a section of battery tray compartment 540 (shown in partial cross section). The second of the two closely spaced wall surfaces (520) is defined by the wall surface facing the inner wall surface 510 and is defined by a battery cell 550 (also shown in cross section). As previously explained and shown in connection with FIG. 2, an application of battery cells and battery tray compartments arranged in this fashion requiring the coupling of an electronic device to one of the wall surfaces is common in electric vehicles.

Bracket 530 includes a first flat portion 555, a second flat portion 560 and an angled surface portion 565 connecting the two portions along parallel surfaces disposed between an angled surface. Openings 570 and 575 are also provided as shown. Opening 570 is configured to engage locking tab 440, while opening 575 provides convenient access for, for example, welding, the bracket, in the case of a metal bracket, to the inner wall surface 510, which in the case of a battery tray compartment in an electric vehicle is typically also made of a metallic material. Bracket flat portion 555 is generally longer than second flat portion 560 since the latter is sized merely to be welded onto wall surface 510, while flat portion 555 is sized and dimensioned to slide DOWN and fit snugly under hooks 430 and at the same time reach so the top of the locking tab 440 engages opening 570 to lock the bracket and housing together and complete the snap-fit assembly connection.

Arrows 580, 580' show the direction in which the installer is required to grab and manually move CVTN 400 down over bracket 530 until a "snap" is heard or sensed indicating that the connection is secure.

In an alternate exemplary embodiment, instead of any opening 570, a partial recessed groove is provided (not shown). The groove may be shaped and sized to function in a similar way in that the tab lands in the groove and creates a locking engagement with tab 440.

Mechanical bracket 530 may be manufactured as a single metallic or metal-alloy component and shaping it accordingly into three interconnected surfaces with openings.

Projecting from CVTN 400, and specifically from upper left and right connector parts 414, 418 are left and right externally coupled wiring harnesses 414' and 418'. These wiring harnesses are typical push-fit connections fitted together either before or after CVTN 400 has been snap-fit assembled securely onto mechanical bracket 530.

Regarding hooks 430, one skilled in the art could appreciate that the size and orientation of the teeth will vary depending on the stress conditions to which they may be subjected both during assembly and after, as well as the repeated assembly and disassembly for the useful life of the component.

For the positioning and immobilization of the CVTN with respect to the bracket, the hooks—which function as teeth—are required to exhibit sufficient shape memory to ensure that as the mechanical bracket slides on and off a CVTN. This is so the hooks return to their original, non-deformed shape each and every time. Account must be taken for high temperatures, high impact contacts with other devices, and other possible, even if extreme, factors that may detrimentally impact elasticity or material rate of deformity. A choice of plastic, or plastic-like materials, with appropriate desirable properties are well known in the art.

The snap-fit assembly is made more secure by the locking tab feature. Locking tab 430 material selection is also therefore of particular importance. One skilled in the art would appreciate that the selection in terms of number of hooks, hook thickness and spacing, the configuration as well as the number of locking tabs, are a matter of design choice and will depend to a great extent on the application, weight and stresses of electronic device to be snap-fit assembled, as well as cost considerations.

In another aspect, the thickness and material construction of the housing back plate onto which the hooks and locking tab are deployed also may play a role into selecting the number, size, thickness, arrangement and other stress dependent design parameters to prevent early deformation and good snap-fit performance.

The snap-fit assembly of FIG. 5B is configured to be used for securely positioning and locking CVTN 400 in place without the need of a tool, as with the prior art which involved using a securing screw. Simply sliding CVTN 400 all the way down mechanical bracket 530 until locking tab 440 engages (i.e. locks) in opening 570 ensures the secure positioning and locking of CVTN 400.

Likewise, the removal of CVTN 400 from a locked "snap-assembled" position involves disengaging locking tab 440 by pressing the tab away from the opening in the bracket 530 while simultaneously sliding CVTN 400 upwards and away from the mechanical bracket and the battery compartment section to which the bracket is fixedly attached.

The proposed snap-fit solution eliminates the needs for screws or other mechanical members requiring screwdrivers and other instruments that are hard to fit between tight spaces. The efficient, durable, low-cost, easy to use snap-fit assembly mechanism addresses a tremendous need, especially in the automotive industry. In addition, the fact that the snap-fit assembly is achieved by limiting the attaching functionality to the outside of the electronic component (i.e, the housing) in a way that does not interfere with the operation (sensor and electrical operations of internal components) broad application of the snap-fit mechanism with wide reusability and durability even under harsh operating conditions (e.g. temperature, shock, mechanical stress, etc.) is ensured.

The examples used above to describe the present innovative solution should not be viewed as limiting the scope of the present innovative solution. The present innovative solution may be applied to other scenarios and settings other than those described in the presented examples for CVTNs. The present innovative solution should be viewed as applicable to any enclosure of electronic and mechanical components and modules, and combinations thereof, as well as, individual components (without separate enclosure) and non-electronic components that are designed to include the described snap-fit devices.

A person skilled in related art(s) understand that the shape and dimensions of the snap-fit assembly elements in the exemplary embodiments can be modified without departing from the scope of the present invention.

The above exemplary embodiments are intended for use either as enclosures for other components, or as part of other devices, or integrated in the design of other parts.

The above exemplary embodiment descriptions are simplified and do not include elements that are used in the embodiments but are not part of the current invention, are not needed for the understanding of the embodiments, and are obvious to any user of ordinary skill in related art. Furthermore, variations of the exemplary embodiments are possible, where, for instance, certain elements of the exemplary embodiments may be rearranged, omitted, replaced with equivalent, or new added. Equally the modification of the shape and dimensions of the presented components is deemed to fall under the scope of protection of the present innovative solution to the extent that these modifications are obvious to persons skilled in related art and to the extent that these modifications are equivalent to the disclosed exemplary embodiments, or do not convey tangible improvements in the technical effect they offer. Thus, the present invention is not intended to be limited to the embodiments shown herein but is to be accorded the widest scope consistent with the principles and novel features disclosed herein.

Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A plastic housing for an electronic device configured to snap fit connect to a mechanical bracket, wherein the electronic device is a sensor device, the plastic housing including a set of oppositely disposed hooks sized and designed to allow an outer edge of the mechanical bracket to slidably engage the hooks and eventually come to rest along a portion of the edge when a portion of the mechanical bracket comes into contact with a locking tab on the plastic housing.

2. The plastic housing of claim 1, where (a) the mechanical bracket comprises a first and a second parallel surfaces linked by a third surface where the third surface is at an angle relative to the first and the second parallel surfaces, and (b) the first surface and the second surface of the mechanical bracket each comprises an opening.

3. The plastic housing of claim 2, where the locking tab is configured for locking inside the opening of the first surface of the mechanical bracket.

4. The plastic housing of claim 1, where (a) the mechanical bracket comprises a first and a second parallel surfaces linked by a third surface where the third surface is at an angle relative to the first and the second parallel surfaces, (b) the first surface comprises a groove sized to act as a locking tab, and (c) the second surface of the mechanical bracket comprises an opening.

5. The plastic housing of claim 1, wherein the electronic device includes a microprocessor control unit (MPU).

6. A Cell Voltage Temperature Node (CVTN) device including a plastic housing configured to snap fit connect to a mechanical bracket, the plastic housing including a set of oppositely disposed hooks sized and designed to allow an outer edge of the mechanical bracket to slidably engage the hooks and eventually come to rest along a portion of the edge when a portion of the mechanical bracket comes into contact with a locking tab on the plastic housing.

7. The CVTN device of claim 6, where (a) the mechanical bracket comprises a first and a second parallel surfaces linked by a third surface where the third surface is at an angle relative to the first and the second parallel surfaces, and (b) the first surface and the second surface of the mechanical bracket each comprises an opening.

8. The CVTN device of claim 7, where the locking tab is configured for locking inside the opening of the first surface of the mechanical bracket.

9. The CVTN of claim 8, where the mechanical bracket is of the type having a first and a second parallel surfaces linked by a third surface where the third surface is at an angle relative to the first and the second parallel surfaces, the first surface comprises a groove sized to act as a locking tab, and the second surface of the mechanical bracket comprises an opening.

10. A mechanical bracket adapted for snap fit connecting a plastic housing of an electronic device, wherein the electronic device is a sensor device, where the plastic housing includes a set of oppositely disposed hooks sized and designed to allow an outer edge of the mechanical bracket to slidably engage the hooks and eventually come to rest along a portion of the edge when a portion of the mechanical bracket comes into contact with a locking tab on the plastic housing.

11. The mechanical bracket of claim 10, where the mechanical bracket comprises a first and a second parallel surfaces linked by a third surface where the third surface is at an angle relative to the first and the second parallel surfaces, and the first surface and the second surface of the mechanical bracket each comprises an opening.

12. The mechanical bracket of claim 11, where the locking tab is configured for locking inside the opening of the first surface of the mechanical bracket.

13. The mechanical bracket of claim 12, where the opening of the second surface of the mechanical bracket is configured for securely attaching the mechanical bracket to an external surface.

14. The mechanical bracket of claim 10, where the mechanical bracket is of the type having a first and a second parallel surfaces linked by a third surface where the third surface is at an angle relative to the first and the second parallel surfaces, the first surface comprises a groove sized to act as a locking tab, and the second surface of the mechanical bracket comprises an opening.

15. A snap-fit assembly comprising:
a mechanical bracket; and
an electronic device including a plastic housing configured to snap fit connect to the mechanical bracket, wherein the electronic device is a sensor device, the plastic housing including a set of oppositely disposed hooks sized and designed to allow an outer edge of the mechanical bracket to slidably engage the hooks and eventually come to rest along a portion of the edge when a portion of the mechanical bracket comes into contact with a locking tab on the plastic housing.

16. The snap-fit assembly of claim 15, where the mechanical bracket comprises a first and a second parallel surfaces linked by a third surface where the third surface is at an angle relative to the first and the second parallel surfaces, and the first surface and the second surface of the mechanical bracket each comprises an opening.

17. The snap-fit assembly of claim 15, where the mechanical bracket is of the type having a first and a second parallel surfaces linked by a third surface where the third surface is at an angle relative to the first and the second parallel surfaces, the first surface comprises a groove sized to act as a locking tab, and the second surface of the mechanical bracket comprises an opening.

* * * * *